Sept. 7, 1937.  H. J. HASBROUCK, JR., ET AL  2,092,158
FILM GATE ASSEMBLY
Filed June 28, 1935
FIG_1
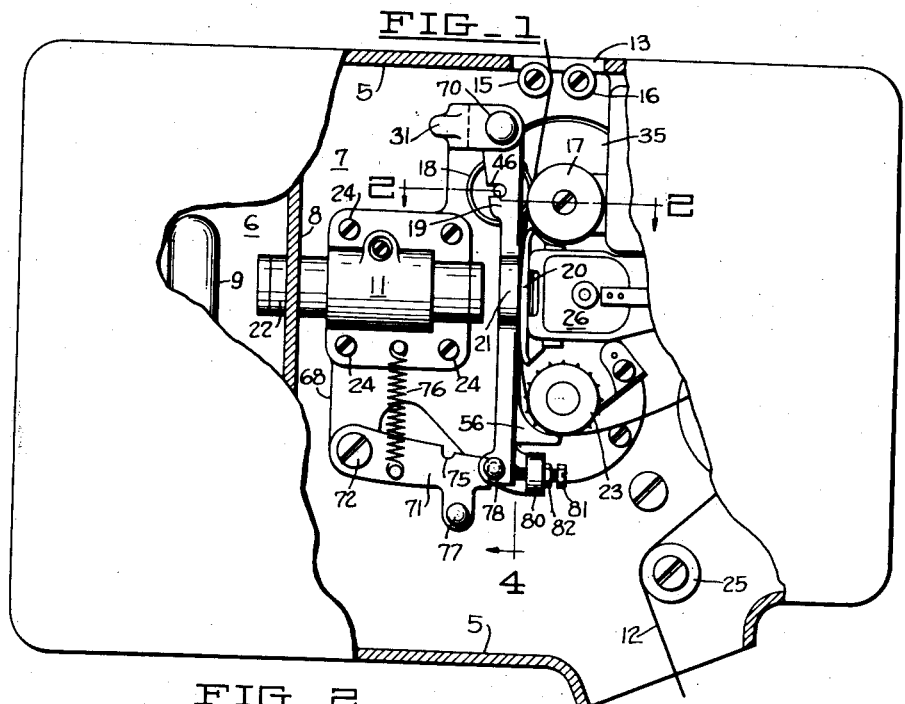
FIG_2
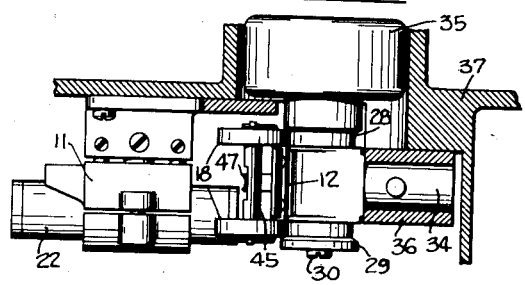
FIG_3
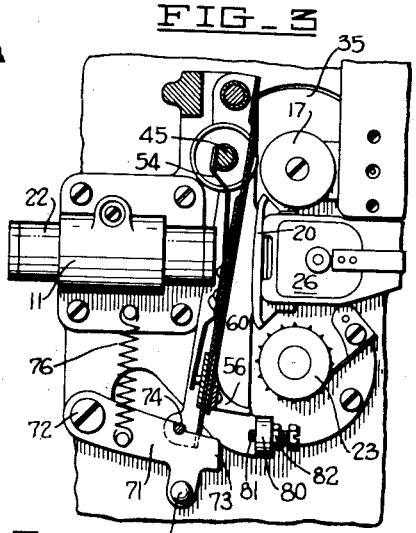
FIG_4
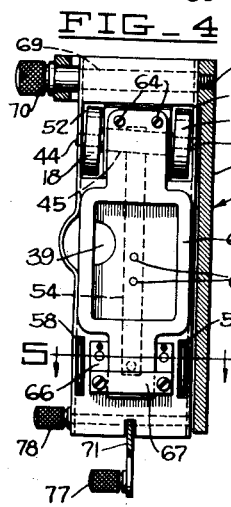
FIG_5
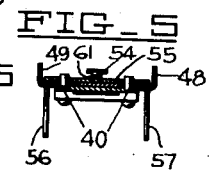
INVENTORS
Harold J. Hasbrouck, Jr.
Ernest Ross
BY
*Wl. R. Goshaw*
ATTORNEY Patented Sept. 7, 1937

2,092,158

UNITED STATES PATENT OFFICE 2,092,158

FILM GATE ASSEMBLY

Harold J. Hasbrouck, Jr., Flushing, and Ernest Ross, Elmhurst, N. Y., assignors to United Research Corporation, Long Island City, N. Y., a corporation of Delaware Application June 28, 1935, Serial No. 28,846

10 Claims. (Cl. 179—100.3)

This invention relates to talking motion picture systems and apparatus and particularly to an element thereof which functions to guide the film past a sound translation point.

In the recording and reproduction of sound on and from linear carriers such as motion picture film, one of the essentials for perfect recording and reproduction is that the film pass the translation point at a definite constant position with respect to certain associate apparatus of the system. In recording, light is impressed on the film, in reproduction, through the film, and in each case the film is advanced or driven by means of toothed sprockets. In many instances, the film passes between pressure contacts at or near the translation point, the film being pulled therethrough by a sprocket. A substantially constant speed is provided by a flywheel and roller assembly adjacent the translation point while a light source and optical slit system provide the light beam passing onto or through the film.

The present invention is directed to the gate which guides the film past the light beam and maintains it at a definite position with respect thereto. The principal object of the invention is to facilitate the threading of the film through the gate and to provide the film with uniform pressure at its sliding contacts and at its contact with a flywheel roller which functions to give the film a constant speed. The gate has also been provided with means for guiding the film around or onto a drive sprocket on one side of the translation point, the object of this feature being to permit the flexibility of the film to aid in smoothing out sprocket teeth ripples and variations in speed.

Other features of the invention and the invention itself will be more fully understood by reference to the following description read in conjunction with the accompanying drawing, in which Fig. 1 is a side elevational view, partly in section, of a sound recording apparatus employing a preferred form of my invention.

Fig. 2 is a sectional plan view showing the pressure roller mounted on the film gate and associated with a flywheel roller and is taken along line 2—2 of Fig. 1.

Fig. 3 is a sectional side elevational view showing the film gate in an open position.

Fig. 4 is a front elevational view of the film gate taken along the line 4—4 of Fig. 1; and Fig. 5 is a sectional plan view taken along the line 5—5 of Fig. 4.

Referring to Fig. 1 the sound reproducing apparatus is mounted in a casing 5 having two compartments 6 and 7 separated by a wall 8. An exciter lamp 9 mounted in the compartment 6 furnishes constant intensity light when energized from a suitable source of supply (not shown).

A film 12 is fed from a supply reel (not shown) into an opening 13 formed on the upper wall of the casing 5, between two guide rollers 15 and 16 and thence between a flywheel roller 17 and spring pressure rollers 18 which will be described in detail hereinafter. The film 12 then passes between a film gate 19 and an aperture shoe or plate 20 past a point 21 where light from the exciter lamp 9 is projected thereon through a slit in a lens barrel 22 in a mounting 11 in the form of a narrow slit of light horizontally disposed with respect to the film gate 19. The film then travels onto a continuously rotating sprocket 23, thence over a hold back sprocket (not shown), then over a roller 25 and to a take-up reel (not shown). The lens mounting 11 is adjustable and is disclosed and claimed in co-pending application Serial No. 24,832, filed June 4, 1935.

A light cell mount 26 of the type described and claimed in the U. S. Patent No. 2,031,646, of Feb. 25, 1936, contains a light sensitive cell and is positioned directly in back of the aperture plate 20 to allow the cell to receive the modulated light beam produced by the sound track of the film 12 moving past the sound gate.

Referring now to Figs. 2, 3, 4 and 5, the flywheel roller 17 comprises two flanged rolls 28 and 29 mounted upon an axle 30 supported by a mount 34. A flywheel 35 is provided on the axle 30 adjacent the roll 28 to smooth out any small variations in the speed of the film as it passes the sound translation point 21. In order to align the flywheel roller 17 in any desired position, the mount 34 is provided with an adjustment of the bearing portion which is journaled in a block 36. The block 36 is secured to the wall 37 of the apparatus in any suitable manner. This roller and flywheel assembly is disclosed in detail and claimed in co-pending application Serial No. 28,847, filed June 28, 1935.

The pressure rollers 18 adjacent the flywheel roller 17 are mounted upon the sound film gate 19. In order to insure perfect contact between the rollers 17 and 18, the rollers 18 are constructed so as to be self aligning. This is accomplished by mounting the ends of the axle 45 of the rollers 18 within grooves 46 provided in rearwardly extending flanges 48 and 49 of the film gate 19 (see Fig. 5). Rollers 18 project through apertures 52 and 53 in the film gate 19 and are resiliently held against the flywheel roller 17 by a flat spring 54 when the gate is in a closed position. The spring is attached to the central portion of the frame of the gate by rivets 60, the spring being curved where it contacts the axle 45 as shown at 47 to facilitate equalization of the rollers.

The lower portion of the gate is provided with a self-aligning film shoe 55 which is U-shaped in construction (Fig. 5) and held loosely to the gate frame by pins 40. The ends 56 and 57 of the shoe 55 project through apertures 58 and 59 of the gate 19 and have arcuate surfaces formed thereon, the forward tips of which contact and hold the film in engagement with the sprocket 23 when the gate 19 is in a closed position. The rear portions of the arcuate surfaces are spaced away from the sprocket to permit the film to bow out due to its own elasticity which functions to smooth out sprocket teeth ripples as well as provide space for a slight amount of film accumulation in the event of a speed variation between the flywheel roller 17 and sprocket 23.

One end of the spring 54 bears on a projection 61 formed on the back of the shoe 55 allowing the shoe tips to align and equalize themselves. A spring 63 at the front of the gate 19 provides initial tension to hold the film in engagement with the aperture plate 20. The upper end of the spring 63 is attached as by screws 64 to the gate 19, but its lower end is free to move between a pair of guide blocks 66 and 67 secured to the gate 19. The gate 19 is provided with an aperture 39 to allow the light beam from the barrel 22 to be projected therethrough. The shoe or plate 20 also has a registering aperture to allow the light beam to fall upon the light cell within the cell mount 26.

The gate 19 is pivotally mounted at its upper end by a pin 69 to a stationary bracket 31 on base 68, this base being attached to the back wall of casing 5 by screws 24 and also serving as a base for the lens mount 11. In order to remove the gate 19 for cleaning, etc., the pin 69 is provided with a knurled head 70 which may be rotated by hand to unscrew the threaded portion 41 (Fig. 4) of the pin 69 from the base 68 and thus allow withdrawal of the gate 19.

In order to hold the gate 19 in either open or closed position, a latch member 71 is provided adjacent its lower end which is pivotally mounted by a screw 72 to a lower portion of the base plate 68. The front end of the latch 71 is inclined as at 73 and is adapted to engage a rod 74 carried on the lower portion of the film gate 19. The surface 73 will produce a wedging action on the rod 74 and hold the gate firmly in a closed position. A notch 75 (see Fig. 1) is provided on the upper surface of the latch 71 and is adapted to receive the rod 74 and thus hold the gate in open position when threading film in the apparatus. A spring 76 is provided having one end attached to the latch 71 and the other end to the bracket 68 to urge the latch upwardly and to maintain the gate either closed or open when set in either position. A knurled handle 77 on the latch 71 and a second knurled handle 78 at the lower end of the gate 19 facilitate the opening and closing of the film gate.

In order to adjust the limit of forward movement of the film gate 19, an adjustable stop is provided which comprises a lug 80 projecting from the base 68 in which a screw 81 is threadably mounted. A locknut 82 is provided to lock the screw 81 in position.

Although the gate has been disclosed embodied in a sound reproducing unit, it is also applicable to a system for recording sound wherein the film is guided past a recording point. The opening of this type of gate removes the rollers 18 from the roller 17 and the shoe 55 from the sprocket 23, only one motion being required. The film may then be easily threaded over the roller 17 and sprocket 23.

It is to be noted that the axis of the rollers 18 may be tilted from a horizontal position as shown in Fig. 4, this being accomplished by offsetting the bearing end portions 44 of the axle 45. This produces a "scrubbing" action on the film which urges it toward and maintains the edge thereof against the flange 29 on the roller 17, thus guiding the film. A similar action is disclosed in Kellogg Patent 2,012,130 of Aug. 20, 1935. However, the axis of rollers 18 is usually horizontal, as shown in Figs. 1 and 2, since the guiding effect is produced by tilting the roller 17 as disclosed and claimed in the above-mentioned co-pending application Serial No. 28,847, filed June 28, 1935, the basic method of film steering or guiding in this manner being disclosed and claimed in co-pending application Serial No. 28,648 filed June 27, 1935.

What is claimed is:

1. In combination with a sound reproducing unit, a shoe over which a film is adapted to be advanced, said shoe having a light aperture therein, a rectangular film gate arranged in front of said aperture, a mounting for said gate enabling said gate to move outwardly from said shoe, said mounting also enabling said gate to rotate about the upper end thereof, a self-aligning roller mounted on and adjacent the upper end thereof, spring tensioning means extending longitudinally of said gate and adapted to maintain said film against said shoe when said gate is in closed position, an arm adapted to bear against the lower end of said gate to hold said gate in closed position, a stop limiting the closed position of said gate, and a spring catch on said arm for maintaining said gate against said stop, said arm and catch being adapted to hold said gate in a predetermined open position.

2. In combination with film drive mechanism, a film gate, an aperture shoe, a sprocket on one side of said shoe for advancing film thereover, a flywheel roller on the other side of said shoe for stabilizing the advancement of said film, a rectangular gate structure adapted to rotate about the upper end thereof, said gate maintaining said film against said shoe when in closed position, a roller on said gate adjacent the upper end thereof and adapted to maintain said film against said flywheel roller when said gate is in closed position, and shoes on the other end of said gate for maintaining said film against said sprocket at one point thereof, said shoes having a configuration and position with respect to said sprocket so as to bow said film from said sprocket at its initial point of contact therewith.

3. A film gate assembly comprising a shoe having a light aperture therein, means for progressing film over said shoe, said means including a sprocket and flywheel roller, a gate structure pivoted at the upper end thereof, a self-aligning roller and tensioning means at the upper end of said structure for maintaining a film against said flywheel roller, a stationary shoe at the other end of said gate structure for maintaining said film in contact with said sprocket on one portion thereof and permitting said film to bow at the initial point of contact with said sprocket, said shoe and said roller being removable from said sprocket and flywheel roller, respectively, for threading said film when said gate structure is in open position, and a latch for maintaining said gate in either open or closed position.

4. A film gate comprising a rectangular frame, means for pivotally supporting said frame at the upper end thereof whereby the gate may be opened and closed, a self-aligning roller mounted at the upper end of said frame, and a self-aligning shoe mounted on the other end of said frame, said roller and shoe being simultaneously removable from co-operating elements when said gate is in open position.

5. In combination, film advancing mechanism including a roller over which film is adapted to move, a stationary shoe, a rectangular gate structure adapted to hold said film against said shoe, said gate being adapted to pivot about a support at the upper end thereof, a second roller on said structure, said roller being resiliently mounted to bear against the film in contact with said first roller, means for mounting said second roller so that its axis is tilted in a plane parallel to the plane of said gate structure, a sprocket adjacent the lower end of said gate structure for advancing film through said gate, and a shoe mounted on the lower end of said gate adapted to hold said film on said sprocket at one point and allowing said film freedom of action over the remaining portion of said sprocket.

6. A film gate comprising self-aligning film shoes mounted thereon, at one end thereof and a self-aligning pressure roller mounted thereon at the other end thereof.

7. A film gate comprising a self-aligning film roller, adapted to engage the edges of a film, mounted thereon at one end thereof.

8. A film gate assembly comprising a rectangular frame adapted to be pivoted at one end thereof, a flat spring mounted on one side of said frame adapted to bear against a film, pressure rollers adjacent one end of said frame, said rollers having an axle adjustable toward and away from the plane of said frame, tensioning means bearing on said axle at substantially the midpoint between said rollers, the ends of said axle being guided by apertures in said frame, and means at the other end of said frame for opening and closing said gate.

9. A film gate assembly in accordance with claim 8, in which pressure shoes are provided at the other end of said frame said shoes being resiliently mounted at a point substantially midway therebetween.

10. A film gate assembly comprising a rectangular frame adapted to be pivotally mounted at the upper end thereof, means at the lower end of said gate for opening and closing said gate, tensioning means in the plane of said gate for bearing against a film, a pair of rollers adapted to bear on the edges of said film at one end of said gate, said rollers being movable toward and away from the plane of said gate, tensioning means for bearing on the axle of said rollers at a point substantially midway between said rollers, and pressure shoes resiliently mounted at the other end of said gate and adapted to bear on the edges of said film, said shoes being adjustable toward and away from the plane of said gate.

HAROLD J. HASBROUCK, Jr.
ERNEST ROSS.